United States Patent
Etchason (10) Patent No.: US 11,933,390 B2
(45) Date of Patent: Mar. 19, 2024

(54) MULTI-SPEED ADDER ASSEMBLY IN A MULTI-SPEED TRANSMISSION

(71) Applicant: ALLISON TRANSMISSION, INC., Indianapolis, IN (US)

(72) Inventor: Edmond M. Etchason, New Palestine, IN (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

(21) Appl. No.: 18/144,287

(22) Filed: May 8, 2023

(65) Prior Publication Data

US 2023/0375076 A1    Nov. 23, 2023

Related U.S. Application Data

(60) Provisional application No. 63/473,282, filed on May 17, 2022.

(51) Int. Cl.
*F16H 3/64* (2006.01)
*F16H 57/02* (2012.01)

(52) U.S. Cl.
CPC ..... *F16H 3/64* (2013.01); *F16H 2057/02013* (2013.01); *F16H 2200/0065* (2013.01); *F16H 2200/0073* (2013.01); *F16H 2200/0095* (2013.01); *F16H 2200/2007* (2013.01); *F16H 2200/201* (2013.01); *F16H 2200/2043* (2013.01); *F16H 2200/2046* (2013.01)

(58) Field of Classification Search
CPC ............. F16H 3/64; F16H 2057/02013; F16H 2200/0065; F16H 2200/0095; F16H 2200/2007; F16H 3/663; F16H 2200/0073; F16H 2200/201; F16H 2200/2043; F16H 2200/2046
USPC ................................ 475/282, 290, 339, 340
See application file for complete search history.

(56) References Cited

U.S. PATENT DOCUMENTS

| | | | |
|---|---|---|---|
| 4,070,927 A | 1/1978 | Polak | |
| 4,233,861 A | 11/1980 | Gaus et al. | |
| 5,030,186 A | 7/1991 | Asada | |
| 5,049,116 A | 9/1991 | Asada | |
| 5,057,063 A | 10/1991 | Asada et al. | |
| 5,098,357 A | 3/1992 | Asada et al. | |
| 5,800,304 A | 9/1998 | Beim et al. | |

(Continued)

FOREIGN PATENT DOCUMENTS

| | | | |
|---|---|---|---|
| DE | 102014224089 A1 | 6/2016 | |
| DE | 102015218591 A1 * | 3/2017 | |

*Primary Examiner* — Roger L Pang
(74) *Attorney, Agent, or Firm* — Taft Stettinius & Hollister LLP; Stephen F. Rost (57) ABSTRACT

A multiple speed transmission includes an input shaft, an output shaft, a first planetary gearset having a first member, a second member, and a third member, and a second planetary gearset having an input member, a reaction member, a second member, and a third member. The transmission also includes a plurality of interconnecting members each connected between at least one of the first and second planetary gearsets and at least another of the first and second planetary gearsets. The transmission includes a plurality of torque-transmitting mechanisms which are selectively engageable in combinations of at least two to establish a plurality of forward speed ratios and a plurality of reverse speed ratios between the input shaft and the output shaft.

19 Claims, 5 Drawing Sheets

(56) References Cited

U.S. PATENT DOCUMENTS

| | | | |
|---|---|---|---|
| 6,083,135 | A | 7/2000 | Baldwin et al. |
| 6,743,141 | B2 | 6/2004 | Bucknor et al. |
| 6,932,735 | B2 | 8/2005 | Kao et al. |
| 7,549,942 | B2 | 6/2009 | Gumpoltsberger |
| 8,113,983 | B2 | 2/2012 | Gumpoltsberger |
| 8,131,435 | B2 | 3/2012 | Ivacko et al. |
| 9,568,069 | B2 | 2/2017 | Beck et al. |
| 10,948,052 | B2 | 3/2021 | Etchason |
| 11,137,050 | B2 | 10/2021 | Etchason |
| 2007/0238573 | A1 | 10/2007 | Kamm et al. |
| 2007/0275815 | A1 | 11/2007 | Raghavan |
| 2008/0015077 | A1 | 1/2008 | Kamm et al. |
| 2008/0015083 | A1* | 1/2008 | Chang ................ F16H 3/663 475/286 |
| 2008/0234093 | A1 | 9/2008 | Diosi et al. |
| 2011/0300987 | A1 | 12/2011 | Diosi et al. |
| 2014/0038767 | A1 | 2/2014 | Koch et al. |
| 2014/0073745 | A1 | 3/2014 | Bailey et al. |
| 2015/0133258 | A1 | 5/2015 | Beck et al. |
| 2016/0010728 | A1 | 1/2016 | Scholz |
| 2017/0175855 | A1 | 6/2017 | Etchason |
| 2017/0219053 | A1 | 8/2017 | Yasuta et al. |
| 2018/0112747 | A1 | 4/2018 | Warth et al. |
| 2018/0202518 | A1 | 7/2018 | Dersjö et al. |
| 2020/0370623 | A1 | 11/2020 | Na et al. |
| 2021/0018070 | A1* | 1/2021 | Etchason ............ F16H 3/663 |

* cited by examiner

| Range | C1 | C2 | C3 | C4 | B1 | B2 | B3 | Gear Ratio |
|-------|----|----|----|----|----|----|----|------------|
| F1 | X |   |   |   |   |   | X | 6.08 |
| F2 | X |   |   |   | X |   |   | 3.51 |
| F3 | X |   |   |   |   | X |   | 2.81 |
| F4 | X |   |   | X |   |   |   | 1.91 |
| F5 | X | X |   |   |   |   |   | 1.43 |
| F6 | X | X |   |   |   |   |   | 1 |
| F7 |   | X | X | X |   |   |   | 0.74 |
| F8 |   | X | X |   |   |   |   | 0.64 |
| F9 |   | X | X |   |   | X |   | 0.28 |
| N |   |   |   |   | X | or | X |   |
| R1 |   |   | X |   | X | X | X | -12.49 |
| R2 |   |   | X |   |   |   |   | -4.8 |
| R3 |   |   |   |   |   | X |   | -2.72 |
| R4 |   | X |   |   |   |   | X | -1.02 |

| Range | C1 | C2 | C3 | C4 | B1 | B2 | B4 | B3 | Gear Ratio |
|---|---|---|---|---|---|---|---|---|---|
| F1 | X | | | | | | | X | 6.08 |
| F2 | X | | | | X | | | | 3.51 |
| F3 | X | | | | | | X | | 2.96 |
| F4 | X | | | X | | | | | 2.81 |
| F5 | X | | X | | | | | | 1.91 |
| F6 | X | | | | | X | | | 1.43 |
| F7 | | X | | | | | | | 1 |
| F8 | | X | X | | | | | | 0.74 |
| F9 | | X | X | X | | | | | 0.64 |
| F10 | | X | X | | | X | | | 0.28 |
| F11 | | X | X | | | | X or | | 0.22 |
| N | | | | | X | | | X | |
| R1 | | | X | | X | | | X | -12.49 |
| R2 | | | X | | | | X | | -4.8 |
| R3 | | | X | | | X | | | -3.16 |
| R4 | | | | | | | | X | -2.72 |
| R5 | | X | | | | | | | -1.02 |

Fig. 5

MULTI-SPEED ADDER ASSEMBLY IN A MULTI-SPEED TRANSMISSION

RELATED DISCLOSURES

This application claims the benefit of U.S. Provisional Patent Application Ser. No. 63/473,282, filed May 17, 2022, the disclosure of which is hereby incorporated by reference in its entirety.

FIELD OF THE DISCLOSURE

The present disclosure relates to a multiple speed transmission, and in particular to a multiple speed transmission capable of achieving multiple forward and reverse ranges or speeds.

BACKGROUND

Multiple speed transmissions use a number of friction clutches or brakes, planetary gearsets, shafts, and other elements to achieve a plurality of gear or speed ratios. The architecture, i.e., packaging or layout of the aforementioned elements, is determined based on cost, size, packaging constraints, and desired ratios. There is a need for new architectural designs of multiple speed transmissions for achieving different ratios with improved performance, cost, efficiency, responsiveness, and packaging.

SUMMARY

In a first implementation of the present disclosure, a multiple speed transmission includes an input shaft; an output shaft; a first planetary gearset having a first member, a second member, and a third member; a second planetary gearset having an input member, a reaction member, a second member, and a third member, wherein the second member comprises a first portion and a second portion; a plurality of interconnecting members each connected between at least one of the first and second planetary gearsets and at least another of the first and second planetary gearsets; a first torque-transmitting mechanism selectively engageable to interconnect the input shaft with the first member of the first planetary gearset; a second torque-transmitting mechanism selectively engageable to interconnect the input shaft with the third member of the first planetary gearset and the second member of the second planetary gearset; a third torque-transmitting mechanism selectively engageable to interconnect the third member of the first planetary gearset and the second member of the second planetary gearset with a stationary member; a fourth torque-transmitting mechanism selectively engageable to interconnect the third member of the second planetary gearset with the stationary member; and a fifth torque-transmitting mechanism selectively engageable to interconnect the reaction member of the second planetary gearset with the stationary member; wherein the torque transmitting mechanisms are selectively engageable in combinations of at least two; wherein, the selective engagement of two of the first, second, third, fourth and fifth torque-transmitting mechanisms establishes X number of forward speed ratios and Y reverse speed ratios between the input and output shafts; wherein, the first portion and second portion of the second member are coaxial and rotationally locked to one another.

In one example of this embodiment, the output shaft is continuously interconnected with the second member of the first planetary gearset and the input member of the second planetary gearset. In a second example, the plurality of interconnecting members includes a first interconnecting member directly connected to the first member of the first planetary gearset. In a third example, the plurality of interconnecting members includes a second interconnecting member continuously interconnecting the third member of the first planetary gearset with the second member of the second planetary gearset. In a fourth example, the plurality of interconnecting members includes a third interconnecting member directly connected to the third member of the second planetary gearset.

In a fifth example, the plurality of interconnecting members includes a fourth interconnecting member directly connected to the reaction member of the second planetary gearset. In a sixth example, the first portion of the second member of the second planetary gearset is directly coupled to the third member of the second planetary gearset and the input member of the second planetary gearset. In a seventh example, the second portion of the second member of the second planetary gearset is directly coupled to the reaction member of the second planetary gearset. In an eighth example, the first planetary gearset is disposed within a transmission housing and the second planetary gearset is disposed within an add-on housing, the add-on housing being mounted to the transmission housing.

In a ninth example, the first member of the first planetary gearset comprises an input to the first planetary gearset and the second member of the first planetary gearset comprises an output of the first planetary gearset; the input member of the second planetary gearset comprises an input to the second planetary gearset and the second member of the second planetary gearset comprises an output of the second planetary gearset; the output of the second planetary gearset is connected to the third member of the first planetary gearset to form a second input to the first planetary gearset. In another example, the first members of the first and second planetary gearsets and the reaction member of the second planetary gearset comprise sun gears; the second member of the first and second planetary gearsets comprise carrier members; and the third members of the first and second planetary gearsets comprise ring gears.

In another implementation of the present disclosure, a multiple speed transmission includes an input shaft; an output shaft; a first planetary gearset having a sun gear, a carrier member, and a ring gear; a second planetary gearset having an input member, a reaction member, a carrier member, and a ring gear, wherein the carrier member comprises a first gear and a second gear; a plurality of interconnecting members each connected between at least one of the first and second planetary gearsets and at least another of the first and second planetary gearsets; a first torque-transmitting mechanism selectively engageable to interconnect the input shaft with the sun gear of the first planetary gearset; a second torque-transmitting mechanism selectively engageable to interconnect the input shaft with the ring gear of the first planetary gearset and the carrier member of the second planetary gearset; a third torque-transmitting mechanism selectively engageable to interconnect the ring gear of the first planetary gearset and the carrier member of the second planetary gearset with a stationary member; a fourth torque-transmitting mechanism selectively engageable to interconnect the ring gear of the second planetary gearset with the stationary member; and a fifth torque-transmitting mechanism selectively engageable to interconnect the reaction member of the second planetary gearset with the stationary member; wherein the torque transmitting mechanisms are selectively engageable in combinations of at least two; wherein the selective engagement of two of the first, second, third, fourth and fifth torque-transmitting mechanisms establishes X number of forward speed ratios and Y reverse speed ratios between the input and output shafts; wherein the first gear and second gear of the carrier member of the second planetary gearset are coaxial and rotationally locked to one another; wherein the first gear comprises a greater diameter than the second gear.

In an example of this implementation, the first gear of the carrier member of the second planetary gearset is directly coupled to the ring gear of the second planetary gearset and the input member of the second planetary gearset; the second gear of the carrier member of the second planetary gearset is directly coupled to the reaction member of the second planetary gearset.

In a further implementation of the present disclosure, a multiple speed transmission includes an input shaft; an output shaft; a first planetary gearset having a sun gear, a first carrier member, and a first ring gear; a second planetary gearset having an input member, a reaction member, a second carrier member, a second ring gear, and a third ring gear, wherein the second carrier member comprises a first gear and a second gear; a plurality of interconnecting members each connected between at least one of the first and second planetary gearsets and at least another of the first and second planetary gearsets; a first torque-transmitting mechanism selectively engageable to interconnect the input shaft with the sun gear of the first planetary gearset; a second torque-transmitting mechanism selectively engageable to interconnect the input shaft with the first ring gear of the first planetary gearset and the second carrier member of the second planetary gearset; a third torque-transmitting mechanism selectively engageable to interconnect the first ring gear of the first planetary gearset and the second carrier member of the second planetary gearset with a stationary member; a fourth torque-transmitting mechanism selectively engageable to interconnect the second ring gear of the second planetary gearset with the stationary member; a fifth torque-transmitting mechanism selectively engageable to interconnect the reaction member of the second planetary gearset with the stationary member; a sixth torque-transmitting mechanism selectively engageable to interconnect the third ring gear of the second planetary gearset with the stationary member; wherein the torque transmitting mechanisms are selectively engageable in combinations of at least two; wherein, the selective engagement of two of the first, second, third, fourth, fifth, and sixth torque-transmitting mechanisms establishes X number of forward speed ratios and Y reverse speed ratios between the input and output shafts; wherein, the first gear and the second gear of the second carrier member are coaxial and rotationally locked to one another, the first gear having a greater diameter than the second gear.

In one example of this implementation, the output shaft is continuously interconnected with the first carrier member of the first planetary gearset and the input member of the second planetary gearset. In a second example, the plurality of interconnecting members includes a first interconnecting member directly connected to the sun gear of the first planetary gearset. In a third example, the plurality of interconnecting members includes a second interconnecting member continuously interconnecting the first ring gear of the first planetary gearset with the second carrier member of the second planetary gearset.

In a fourth example, the plurality of interconnecting members includes a third interconnecting member directly connected to the second ring gear of the second planetary gearset. In another example, the plurality of interconnecting members includes a fourth interconnecting member directly connected to the reaction member of the second planetary gearset. In a further example, the plurality of interconnecting members includes a fifth interconnecting member directly connected to the third ring gear of the second planetary gearset.

BRIEF DESCRIPTION OF THE DRAWINGS

The above-mentioned aspects of the present disclosure and the manner of obtaining them will become more apparent and the disclosure itself will be better understood by reference to the following description of the implementations of the disclosure, taken in conjunction with the accompanying drawings, wherein.

Corresponding reference numerals are used to indicate corresponding parts throughout the several views.

DETAILED DESCRIPTION

The implementations of the present disclosure described below are not intended to be exhaustive or to limit the disclosure to the precise forms disclosed in the following detailed description. Rather, the implementations are chosen and described so that others skilled in the art may appreciate and understand the principles and practices of the present disclosure.

Figure 1:
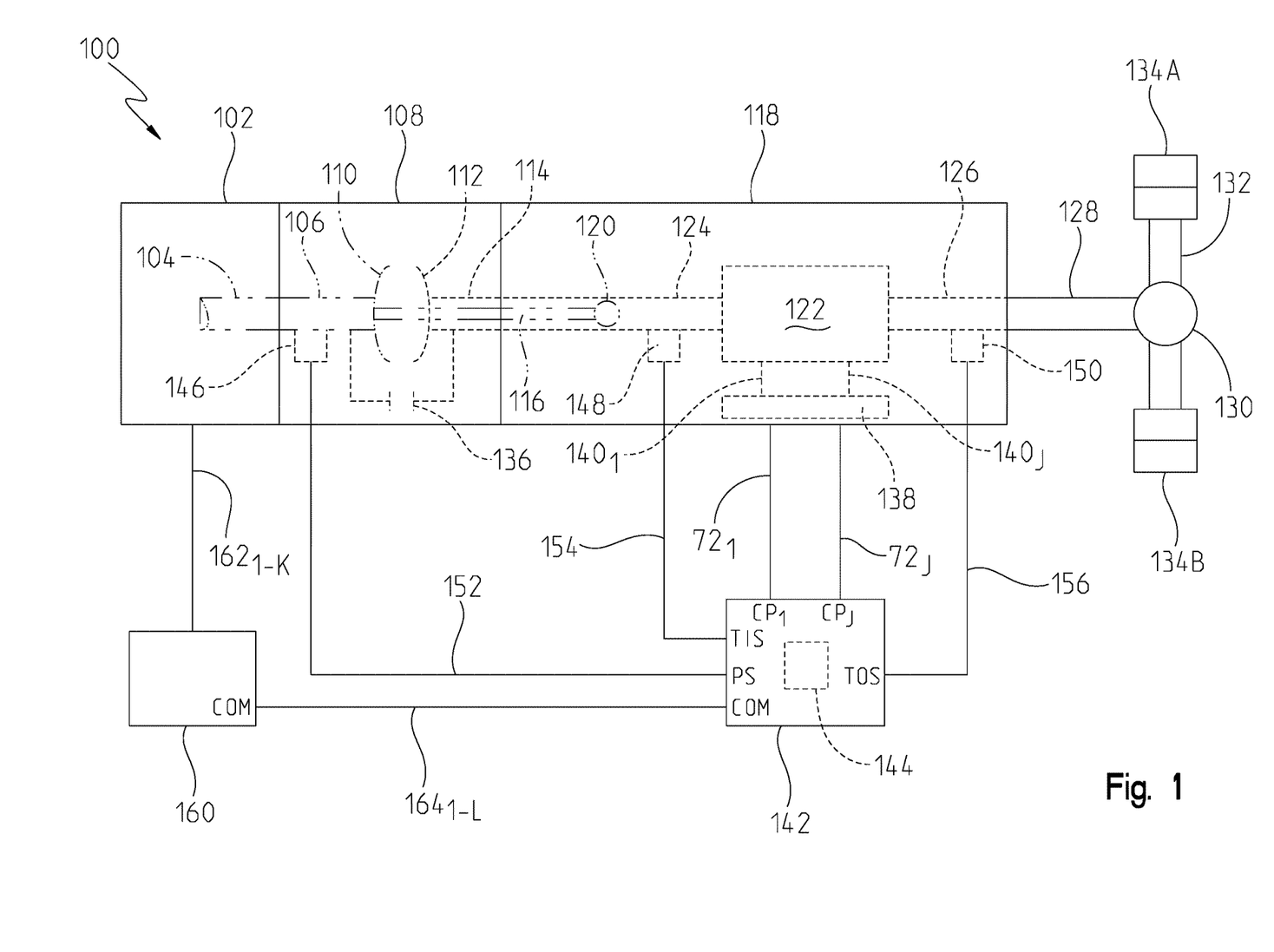
FIG. 1 is an exemplary block diagram and schematic view of one illustrative implementation of a powered vehicular system.

Referring now to FIG. 1, a block diagram and schematic view of one illustrative implementation of a vehicular system 100 having a drive unit 102 and transmission 118 is shown. In the illustrated implementation, the drive unit 102 may include an internal combustion engine, diesel engine, electric motor, or other power-generating device. The drive unit 102 is configured to rotatably drive an output shaft 104 that is coupled to an input or pump shaft 106 of a conventional torque converter 108. The input or pump shaft 106 is coupled to an impeller or pump 110 that is rotatably driven by the output shaft 104 of the drive unit 102. The torque converter 108 further includes a turbine 112 that is coupled to a turbine shaft 114, and the turbine shaft 114 is coupled to, or integral with, a rotatable input shaft 124 of the transmission 118. The transmission 118 can also include an internal pump 120 for building pressure within different flow circuits (e.g., main circuit, lube circuit, etc.) of the transmission 118. The pump 120 can be driven by a shaft 116 that is coupled to the output shaft 104 of the drive unit 102. In this arrangement, the drive unit 102 can deliver torque to the shaft 116 for driving the pump 120 and building pressure within the different circuits of the transmission 118.

The transmission 118 can include a planetary gear system 122 having a number of automatically selected gears. An output shaft 126 of the transmission 118 is coupled to or integral with, and rotatably drives, a propeller shaft 128 that is coupled to a conventional universal joint 130. The universal joint 130 is coupled to, and rotatably drives, an axle 132 having wheels 134A and 134B mounted thereto at each end. The output shaft 126 of the transmission 118 drives the wheels 134A and 134B in a conventional manner via the propeller shaft 128, universal joint 130 and axle 132.

A conventional lockup clutch 136 is connected between the pump 110 and the turbine 112 of the torque converter 108. The operation of the torque converter 108 is conventional in that the torque converter 108 is operable in a so-called "torque converter" mode during certain operating conditions such as vehicle launch, low speed and certain gear shifting conditions. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102, as is known in the art. The torque converter 108 is alternatively operable in a so-called "lockup" mode during other operating conditions, such as when certain gears of the planetary gear system 122 of the transmission 118 are engaged. In the lockup mode, the lockup clutch 136 is engaged and the pump 110 is thereby secured directly to the turbine 112 so that the drive unit output shaft 104 is directly coupled to the input shaft 124 of the transmission 118, as is also known in the art.

The transmission 118 further includes an electro-hydraulic system 138 that is fluidly coupled to the planetary gear system 122 via a number, J, of fluid paths, $140_1$-$140_J$, where J may be any positive integer. The electro-hydraulic system 138 is responsive to control signals to selectively cause fluid to flow through one or more of the fluid paths, $140_1$-$140_J$, to thereby control operation, i.e., engagement and disengagement, of a plurality of corresponding friction devices in the planetary gear system 122. The plurality of friction devices may include, but are not limited to, one or more conventional brake devices, one or more torque transmitting devices, and the like. Generally, the operation, i.e., engagement and disengagement, of the plurality of friction devices is controlled by selectively controlling the friction applied by each of the plurality of friction devices, such as by controlling fluid pressure to each of the friction devices. In one example implementation, which is not intended to be limiting in any way, the plurality of friction devices include a plurality of brake and torque transmitting devices in the form of conventional clutches that may each be controllably engaged and disengaged via fluid pressure supplied by the electro-hydraulic system 138. In any case, changing or shifting between the various gears of the transmission 118 is accomplished in a conventional manner by selectively controlling the plurality of friction devices via control of fluid pressure within the number of fluid paths $140_1$-$140_J$.

The system 100 further includes a transmission control circuit 142 that can include a memory unit 144. The transmission control circuit 142 is illustratively microprocessor-based, and the memory unit 144 generally includes instructions stored therein that are executable by a processor of the transmission control circuit 142 to control operation of the torque converter 108 and operation of the transmission 118, i.e., shifting between the various gears of the planetary gear system 122. It will be understood, however, that this disclosure contemplates other implementations in which the transmission control circuit 142 is not microprocessor-based, but is configured to control operation of the torque converter 108 and/or transmission 118 based on one or more sets of hardwired instructions and/or software instructions stored in the memory unit 144.

In the system 100 illustrated in FIG. 1, the torque converter 108 and the transmission 118 include a number of sensors configured to produce sensor signals that are indicative of one or more operating states of the torque converter 108 and transmission 118, respectively. For example, the torque converter 108 illustratively includes a conventional speed sensor 146 that is positioned and configured to produce a speed signal corresponding to the rotational speed of the pump shaft 106, which is the same rotational speed of the output shaft 104 of the drive unit 102. The speed sensor 146 is electrically connected to a pump speed input, PS, of the transmission control circuit 142 via a signal path 152, and the transmission control circuit 142 is operable to process the speed signal produced by the speed sensor 146 in a conventional manner to determine the rotational speed of the pump shaft 106/drive unit output shaft 104.

The transmission 118 illustratively includes another conventional speed sensor 148 that is positioned and configured to produce a speed signal corresponding to the rotational speed of the transmission input shaft 124, which is the same rotational speed as the turbine shaft 114. The input shaft 124 of the transmission 118 is directly coupled to, or integral with, the turbine shaft 114, and the speed sensor 148 may alternatively be positioned and configured to produce a speed signal corresponding to the rotational speed of the turbine shaft 114. In any case, the speed sensor 148 is electrically connected to a transmission input shaft speed input, TIS, of the transmission control circuit 142 via a signal path 154, and the transmission control circuit 142 is operable to process the speed signal produced by the speed sensor 148 in a conventional manner to determine the rotational speed of the turbine shaft 114/transmission input shaft 124.

The transmission 118 further includes yet another speed sensor 150 that is positioned and configured to produce a speed signal corresponding to the rotational speed of the output shaft 126 of the transmission 118. The speed sensor 150 may be conventional, and is electrically connected to a transmission output shaft speed input, TOS, of the transmission control circuit 142 via a signal path 156. The transmission control circuit 142 is configured to process the speed signal produced by the speed sensor 150 in a conventional manner to determine the rotational speed of the transmission output shaft 126.

In the illustrated implementation, the transmission 118 further includes one or more actuators configured to control various operations within the transmission 118. For example, the electro-hydraulic system 138 described herein illustratively includes a number of actuators, e.g., conventional solenoids or other conventional actuators, that are electrically connected to a number, J, of control outputs, $CP_1$-$CP_J$, of the transmission control circuit 142 via a corresponding number of signal paths $72_1$-$72_J$, where J may be any positive integer as described above. The actuators within the electro-hydraulic system 138 are each responsive to a corresponding one of the control signals, $CP_1$-$CP_J$, produced by the transmission control circuit 142 on one of the corresponding signal paths $72_1$-$72_J$ to control the friction applied by each of the plurality of friction devices by controlling the pressure of fluid within one or more corresponding fluid passageway $140_1$-$140_J$, and thus control the operation, i.e., engaging and disengaging, of one or more corresponding friction devices, based on information provided by the various speed sensors 146, 148, and/or 150.

The friction devices of the planetary gear system 122 are illustratively controlled by hydraulic fluid which is distributed by the electro-hydraulic system in a conventional manner. For example, the electro-hydraulic system 138 illustratively includes a conventional hydraulic positive displacement pump (not shown) which distributes fluid to the one or more friction devices via control of the one or more actuators within the electro-hydraulic system 138. In this implementation, the control signals, $CP_1$-$CP_J$, are illustratively analog friction device pressure commands to which the one or more actuators are responsive to control the hydraulic pressure to the one or more frictions devices. It will be understood, however, that the friction applied by each of the plurality of friction devices may alternatively be controlled in accordance with other conventional friction device control structures and techniques, and such other conventional friction device control structures and techniques are contemplated by this disclosure. In any case, however, the analog operation of each of the friction devices is controlled by the control circuit 142 in accordance with instructions stored in the memory unit 144.

In the illustrated implementation, the system 100 further includes a drive unit control circuit 160 having an input/output port (I/O) that is electrically coupled to the drive unit 102 via a number, K, of signal paths 162, wherein K may be any positive integer. The drive unit control circuit 160 may be conventional, and is operable to control and manage the overall operation of the drive unit 102. The drive unit control circuit 160 further includes a communication port, COM, which is electrically connected to a similar communication port, COM, of the transmission control circuit 142 via a number, L, of signal paths 164, wherein L may be any positive integer. The one or more signal paths 164 are typically referred to collectively as a data link. Generally, the drive unit control circuit 160 and the transmission control circuit 142 are operable to share information via the one or more signal paths 164 in a conventional manner. In one implementation, for example, the drive unit control circuit 160 and transmission control circuit 142 are operable to share information via the one or more signal paths 164 in the form of one or more messages in accordance with a society of automotive engineers (SAE) J-1939 communications protocol, although this disclosure contemplates other implementations in which the drive unit control circuit 160 and the transmission control circuit 142 are operable to share information via the one or more signal paths 164 in accordance with one or more other conventional communication protocols (e.g., from a conventional databus such as J1587 data bus, J1939 data bus, IESCAN data bus, GMLAN, Mercedes PT-CAN).

In the present disclosure, a single compound planetary gearset with a planetary gearset may be compounded to add at least two forward speeds and at least two reverse speeds. In one implementation, for example, the added compound planetary may have an input sun gear, a carrier containing compound pinions locked together and rotating as one in the carrier, a ring gear, and a reaction sun gear. The compound pinions may include a larger diameter portion or gear that meshes with the input sun gear and ring gear. The reaction sun gear meshes with a smaller diameter portion or gear of the compound pinions. In this implementation, the ring gear is connected to one brake and the reaction sun gear is connected to another brake. In another implementation, the larger diameter portion or gear may mesh with the reaction sun gear and the smaller diameter portion or gear may mesh with the input sun gear and ring gear.

In another implementation, another ring gear may be connected to another brake that can be optionally added to add another forward transmission speed or gear ratio and another reverse transmission speed or gear ratio.

A typical application of either of the aforementioned implementations, although not limited to those as described, has the input sun gear connected to an output planetary carrier of an existing transmission where a first sun gear is the input to the output planetary gearset via a first carrier member. Thus, the carrier member functions as an output of the output carrier and transfers torque or power to the input to a second planetary gearset. The output of second planetary gearset is the compound carrier which is fed back to a first ring gear to complete the compounding action. One advantage of these implementations and the present disclosure along with its single planetary carrier gearset is that it may be possible to incorporate it into an add-on housing at the rear of an existing transmission assembly leaving the existing main housing and its internal components unchanged. However, the location of the additional second planetary gearset is not limited to the rear of the transmission.

The first implementation described above adds one forward and one reverse transmission speed or gear ratio that are both deeper than the existing ratios resulting from applying a first brake. In the first implementation, the transmission assembly also adds one forward and one reverse transmission speed or gear ratio that are both faster than the existing ratios resulting from applying the first brake. Again, the second implementation previously described may add yet another forward and another reverse transmission speed or gear ratio close to those provided by applying a second brake.

In a third implementation, if the first ring gear of the first implementation includes an input such as via the second carrier member, a third added forward and a third added reverse transmission speed or gear ratios are available. However, with the second brake applied with the second carrier member generally provides a forward overdrive that may be too fast for some applications.

In the aforementioned implementations, all of the shifts between forward ranges or gears are single transition, and the first two of three shifts in reverse are single transition.

In a further implementation, if the first ring gear in the second implementation described above includes an input such as via the second carrier member, a total of five additional forward speeds and four reverse speeds are available. However, in some instances, one or more of these forward speeds and one reverse speed may be close to the other added speeds. In any event, all shifts between forward speeds are single transition and the three of the shifts between reverse speeds are single transition.

In yet another implementation, two of the four brakes provided in the second implementation may be removed with an associated reduction in transmission speed or gear ratios.

Figure 2:
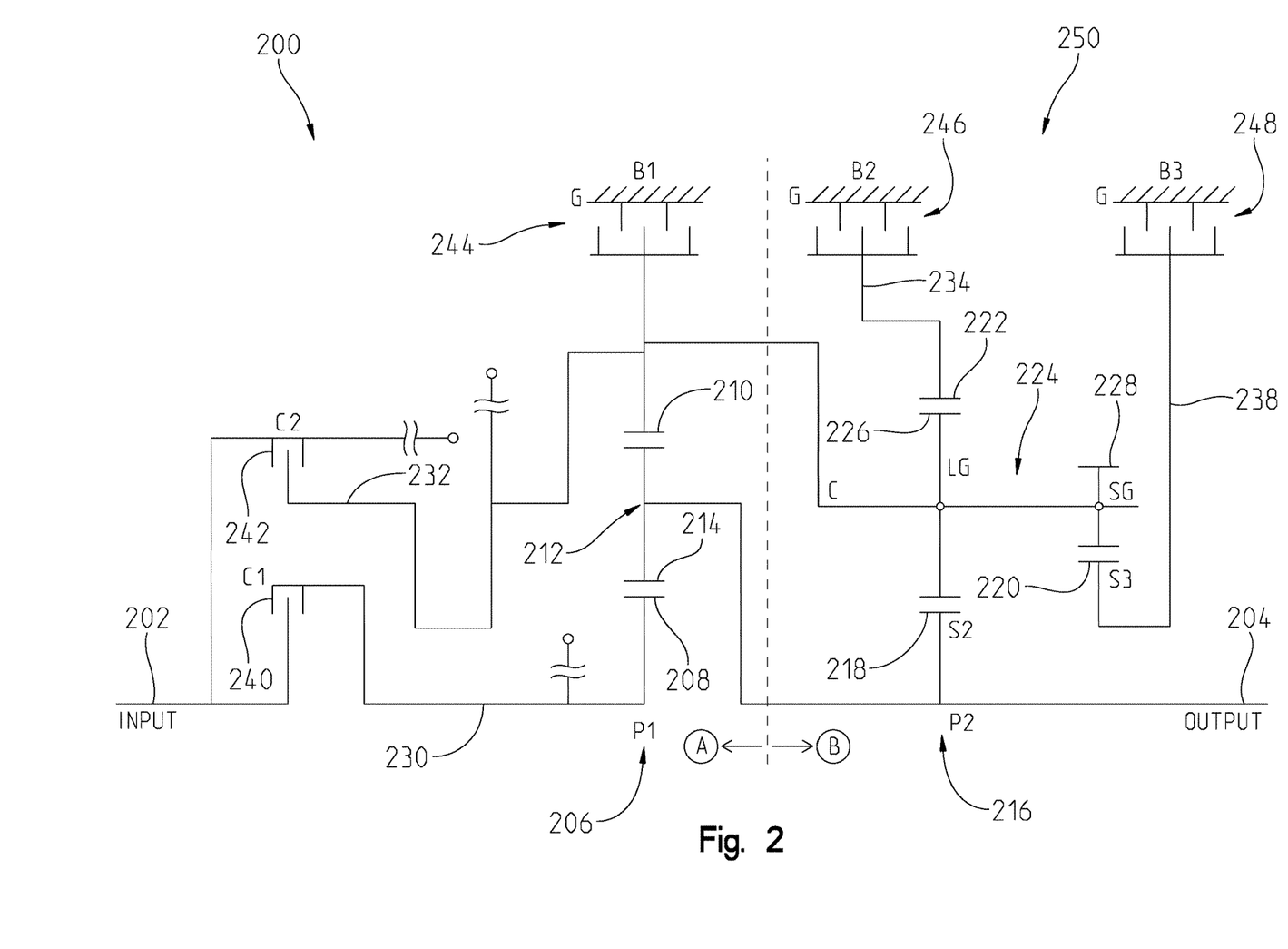
FIG. 2 is a diagrammatic view of a first implementation of a multi-speed transmission.

Referring to FIG. 2 of the present disclosure, a schematic representation or stick diagram illustrates one implementation of a multi-speed transmission 200 according to the present disclosure. The transmission 200 includes an input shaft 202 and an output shaft 204. The input shaft 202 and output shaft 204 can be disposed along the same axis or centerline of the transmission 200. In another aspect, the different shafts can be disposed along different axes or centerlines. In a further aspect, the different shafts can be disposed parallel to one another, but along different axes or centerlines.

The transmission 200 can also include a plurality of planetary gearsets. In the illustrated implementation of FIG. 2, the transmission 200 may include at least a first planetary gearset 206 and a second planetary gearset 216. Each planetary gearset can be referred to as a simple or compound planetary gearset. For example, in some aspects, one or more of the plurality of planetary gearsets can be formed as an idler planetary gearset or a Ravigneaux gearset. In FIG. 2, however, the first planetary gearset 206 is formed as a simple planetary gearset and the second planetary gearset 216 is formed as a compound planetary gearset. While only two planetary gearsets are shown in FIG. 2, the transmission 200 may include additional planetary gearsets in order to achieve a plurality of forward and reverse speeds or gear ratios. In one example, the transmission 200 may include a third planetary gearset. In another example, the transmission 200 may include a third and a fourth planetary gearset. In a further example, the transmission 200 may include a third, a fourth, and a fifth planetary gearset. In yet further examples, the transmission 200 may include six or more planetary gearsets. In other words, the transmission 200 may include a plurality of planetary gearsets to achieve a desired number of forward and reverse speeds or gear ratios.

One or more of the plurality of planetary gearsets can be arranged in different locations within the transmission 200, but for sake of simplicity and in this particular example only, the planetary gearsets are aligned in an axial direction consecutively in sequence (i.e., first, second, etc. between the input and output shafts).

The transmission 200 may also include a plurality of torque-transmitting or gearshifting mechanisms. For example, one or more of these mechanisms can include a clutch or brake. In one aspect, each of the plurality of mechanisms is disposed within an outer housing of the transmission 200. In another aspect, however, one or more of the mechanisms may be disposed outside of the housing. Each of the plurality of torque-transmitting or gearshifting mechanisms can be coupled to one or more of the plurality of planetary gearsets, which will be described further below.

In the implementation of FIG. 2, the transmission 200 can include a first torque-transmitting mechanism 240 and a second torque-transmitting mechanism 242 that are configured to function as clutches. These can be shiftable friction-locked multi-disk clutches, shiftable form-locking claw or conical clutches, wet clutches, or any other known form of a clutch. The transmission 200 can also include a third torque-transmitting mechanism 244, a fourth torque-transmitting mechanism 246, and a fifth torque-transmitting mechanism 248 that are configured to function as brakes (e.g., the torque-transmitting mechanism is fixedly coupled to the outer housing of the transmission 200). Each brake can be configured as a shiftable-friction-locked disk brake, shiftable friction-locked band brake, shiftable form-locking claw or conical brake, or any other type of known brake. With these five torque-transmitting mechanisms, selective shifting of at least nine forward gears and at least four reverse gears is possible.

The transmission 200 of FIG. 2 may also include six or more different shafts, which is inclusive of the input shaft 202 and output shaft 204. Each of these shafts, designated as a first shaft 230, a second shaft 232, a third shaft 234, and a fourth shaft 238 are configured to be connected to one or more of the plurality of planetary gearsets or plurality of torque-transmitting mechanism between the input shaft 202 and output shaft 204. Further, in FIG. 2, the symbol "≈" refers to the corresponding shaft not ending but rather possibly connecting to another component such as an additional torque-transmitting mechanism, planetary gearset, or the like, including the components that rotate the first planetary gearset carrier in reverse.

In FIG. 2, the first planetary gearset 206 can include a first sun gear 208, a first ring gear 210, and a first carrier member 212 that rotatably supports a set of pinion gears 214.

The second planetary gearset 216, which is a compound planetary gearset, can include an input or second sun gear (S2) 218, a reaction or third sun gear (S3) 220, a second ring gear 222, and a second carrier member 224 that rotatably supports a set of pinion shafts. Each pinion shaft includes a first portion 226 (LG) and a second portion 228 (SG). The first portion 226 may include a first gear or large gear, and the second portion 228 may include a second gear or small gear. The first portion 226 has a larger diameter than the second portion 228. In one example, the first portion 226 may have 50% more gear teeth than the second portion 228. In another example, the first portion 226 may have twice as many gear teeth as the second portion 228. In a further example, the first portion 226 may have more gear teeth than the second portion 228.

The first portion 226 and second portion 228 are rotationally locked to one another such that each rotates concomitantly with the other. In one example, the first portion 226 is coaxial with the second portion 228 about the pinion shaft.

In another example, the second carrier member may rotationally support a plurality of pinion shafts, where each pinion shaft includes a first portion 226 and a second portion 228. In one example, the second carrier member 224 may support two pinion shafts. In another example, the second carrier member 224 may support three pinion shafts. In a further example, the second carrier member 224 may support four pinion shafts. In yet another example, the second carrier member 224 may support five or more pinion shafts.

In one example, the length dimension of the first portion 226 may be the same as the length dimension of the second portion 228. In another example, the length dimension of the first portion 226 may be greater than the length dimension of the second portion 228. In a further example, the length dimension of the first portion 226 may be smaller than the length dimension of the second portion 228. In some examples, the first portion 226 and second portion 228 may abut one another on the pinion shaft. In other examples, there may be a gap or space between the first portion 226 and second portion 228 on the pinion shaft.

With the first portion or gear 226 and the second portion or gear 228 located on the same pinion shaft, the first gear 226 and second gear 228 do not mesh with one another. In the implementation of FIG. 2, the first portion or gear 226 of each spindle shaft of the second carrier member 224 meshes or couples to the second sun gear (S2) 218 and the second ring gear 222. The second portion of gear 228 of each spindle shaft of the second carrier member 224 meshes or couples to the reaction or third sun gear 220.

In the second planetary gearset 216, the second ring gear 222 is selectively coupled to the transmission housing (G) via the fourth torque-transmitting mechanism 246, the reaction or third sun gear 220 is selectively coupled to the transmission housing (G) via the fifth torque-transmitting mechanism 248, and first ring gear 210 and second carrier member 224 are selectively coupled to the transmission housing (G) via the third torque-transmitting mechanism 244.

The transmission 200 of FIG. 2 is capable of transferring torque from the input shaft 202 to the output shaft 204 in a plurality of forward gears or ratios and at least one reverse gear or ratio. Each of the forward torque ratios and the reverse torque ratios can be attained by the selective engagement of two of the torque-transmitting mechanisms (i.e., torque-transmitting mechanisms 240, 242, 244, 246, 248). Those skilled in the art will readily understand that a different speed ratio is associated with each torque ratio.

As for the transmission 200, kinematic coupling of the first planetary gearset 206 is shown in FIG. 2. The first sun gear 208 is coupled to the first shaft 230 for common rotation therewith. The first carrier member 212 is coupled to the output shaft 204 and the second sun gear 218 for common rotation therewith. First ring gear 210 is coupled for common rotation with the second shaft 232 and the second carrier member 224.

With respect to the second planetary gearset 216, the input or second sun gear 218 is coupled to the output shaft 204 and the first carrier member 212 for common rotation therewith. The second ring gear 222 is coupled to the third shaft 234 for common rotation therewith. The reaction or third sun gear 220 is coupled to the fourth shaft 238 for common rotation therewith. The first portions or gears 226 of each pinion shafts of the second carrier member 224 are configured to intermesh with the input or second sun gear 218 and the second ring gear 222, and the second portions or gears 228 of each pinion shafts of the second carrier member 224 are configured to intermesh with the reaction or third sun gear 220.

With regards to the kinematic coupling of the five torque-transmitting mechanisms to the previously described shafts, the multiple speed transmission 200 of FIG. 2 provides that the first torque-transmitting mechanism 240 is arranged within the power flow between at least the input shaft 202 and the first shaft 230 and the first sun gear 208. In this manner, the first torque-transmitting mechanism 240 is configured to act as a clutch. The second torque-transmitting mechanism 242 is arranged within the power flow between at least the input shaft 202 and the second shaft 232, the first ring gear 210, and the second carrier member 224. In this manner, the second torque-transmitting mechanism 242 is configured to act as a clutch. In this implementation of the transmission 200 two of the five torque-transmitting mechanisms are configured to act as a clutch and the other three torque-transmitting mechanisms are configured to act as brakes. In alternative implementations, the transmission 200 may include additional clutches and/or brakes. For example, in one specific alternative implementation, the transmission 200 includes four clutches and three brakes to achieve up to nine forward speed or gear ratios and up to four reverse speed or gear ratios.

The third torque-transmitting mechanism 244 (B1), for example, is arranged within the power flow between the second shaft 232, the first ring gear 210, and the second carrier member 224 and the stationary transmission housing, G. The fourth torque-transmitting mechanism 246 (B2) is arranged within the power flow between the third shaft 234 and the second ring gear 222 and the stationary transmission housing, G. Moreover, the fifth torque-transmitting mechanism 248 (B3) is arranged within the power flow between the fourth shaft 238 and the reaction or third sun gear (S3) 220 and the stationary transmission housing, G.

The kinematic couplings of the implementation in FIG. 2 can further be described with respect to the selective engagement of the torque-transmitting mechanisms with respect to one or more components of the plurality of planetary gearsets. For example, in the transmission 200, the first torque-transmitting mechanism 240 is selectively engageable to couple the input shaft 202 to the first shaft 230 and the first sun gear 208. The second torque-transmitting mechanism 242 is selectively engageable to couple the input shaft 202 to the second shaft 232, the first ring gear 210, and the second carrier member 224.

Moreover, the third torque-transmitting mechanism 244 is selectively engageable to couple second shaft 232, the first ring gear 210, and the second carrier member 224 to the housing G of the transmission 200. The fourth torque-transmitting mechanism 246 is selectively engageable to couple third shaft 234 and the second ring gear 222 to the housing G of the transmission 200. Further, the fifth torque-transmitting mechanism 248 is selectively engageable to couple the fourth shaft 238 and the reaction or third sun gear 220 to the housing G of the transmission 200.

In the present disclosure, the transmission incorporates compounding to achieve additional ranges or ratios. Compounding in this context involves connecting two or more members of one planetary gearset to two or more members of another planetary gearset with yet another member serving as a reaction member for the geartrain. Compounding provides gear ratios that are otherwise unattainable in a simple planetary gearset (i.e., one sun gear, one ring gear, and one carrier member). This compounding, however, is not simply connecting different gearsets in series. The output of the first gearset is generally the input to the second gearset. The output of the second gearset may then be fed back to what normally may have been the reaction member of the first gearset. The new reaction member for the geartrain is in the second planetary gearset. The resulting gear ratio may differ from the result of the reaction member being in the first gearset.

In one example, it is possible to compound a planetary gearset such that its normal braked reaction member is made to rotate in one direction only relative to the input direction of the gearset. The second gearset is generally a simple gearset with one brake. In this disclosure, however, the implementations described herein may compound a planetary gearset such that its normal braked reaction member is made to rotate in both directions relative to the input direction of the gearset. This would otherwise require a third or fourth simple planetary gearset with the associated clutches or brakes.

It has been found that the benefit of rotating the gearset's normally braked member in both the same and opposite directions as the gearset input is the ability to add both deeper and shallower gear ratios or speeds to the transmission as opposed to just adding one or the other. This ability can be applied with the transmission in reverse as well. In order to achieve this, the transmission 200 of FIG. 2 is designed such that the carrier output is located in the front of the carrier. By doing so, this facilitates feeding the output of the second planetary gearset 216 back to the first ring gear 210 in order to accomplish the compounding of the first planetary gearset 206.

In addition, the reaction sun gear 220 is positioned to the rear of the first portion or gear 226 of the second carrier member 224. As such, the reaction sun gear 220 is able to mesh with the second portion or gear 228. The reaction sun gear 220 therefore is connected to the third brake 248.

In the aforementioned implementation of the transmission 200, the input or second sun gear 218 is connected to the first carrier member 212, which is the output of the first planetary gearset 206. The first sun gear 208 functions as the input of the first planetary gearset 206. Thus, the output of the first planetary gearset 206 becomes the input to the second planetary gearset 216. Moreover, the output of the second planetary gearset 216 is configured as the second carrier member 224, which feeds torque to the first ring gear 210 to complete the compounding action.

An advantage of the implementation of FIG. 2 is the ability to incorporate the second planetary gearset 216 in an add-on housing 250 to the rear of the transmission 200. In other words, the dashed line separates a first portion A that may be from an existing transmission 200 from a second portion B which includes the add-on housing 250 and the compound planetary or Ravigneaux-type gearset 216. By doing this, the existing arrangement of components including the first planetary gearset 206 of the transmission 200 may be uninterrupted and connected to the components of the add-on housing 250. Although the add-on housing 250 is shown being mounted to a rear portion of the transmission 200, it is further possible the add-on housing 250 may be mounted to other portions or locations of the transmission 200.

In another implementation, if the first ring gear 210 has an input to receive torque such as when the second torque-transmitting mechanism 242 is applied, an additional forward and reverse speed or gear ratio can be achieved.

Figure 4:
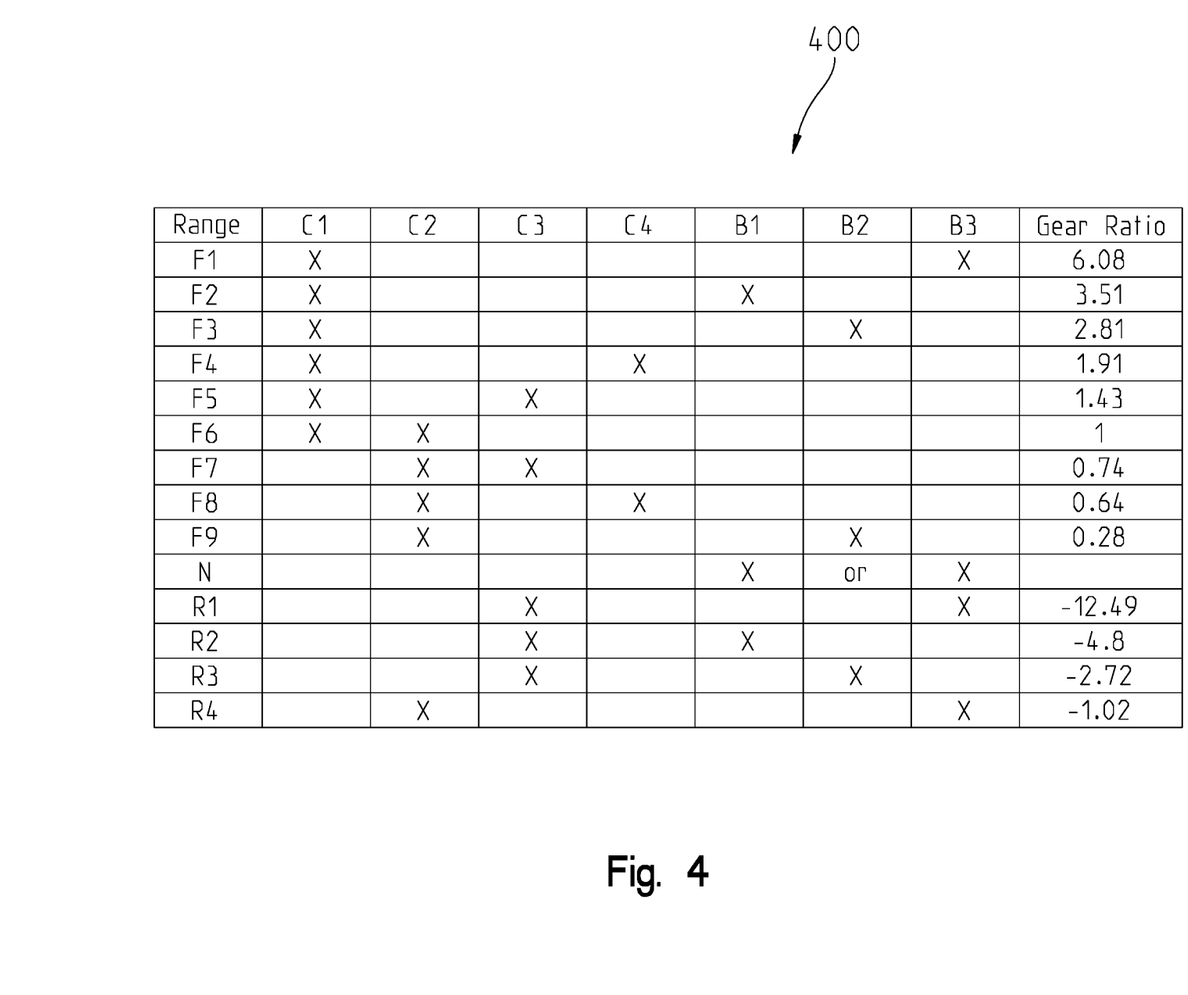
FIG. 4 is a truth table presenting an example of a state of engagement of various torque-transmitting mechanisms in each of the available forward and reverse speeds or gear ratios of the multi-speed transmission of FIG. 2.

The aforementioned implementation of FIG. 2 is capable of transmitting torque from a respective input shaft 202 to a respective output shaft 204 in at least nine forward torque ratios and four reverse torque ratios. Referring to FIG. 4, one example of a truth table is shown representing a state of engagement of various torque transmitting mechanisms in each of the available forward and reverse speeds or gear ratios of the transmissions illustrated in FIG. 2. It is to be understood that FIG. 4 is only one example of any number of truth tables possible for achieving at least nine forward ratios and four reverse ratios, and one skilled in the art is capable of configuring diameters, gear tooth counts, and gear configurations to achieve other ratios.

In the implementation of FIG. 4, a first reverse ratio (R1) can be achieved by the selective engagement of the torque-transmitting mechanisms as set forth in the table. Moreover, the table in FIG. 4 illustrates the implementation of FIG. 2 having an additional sixth torque-transmitting mechanism (C3) and a seventh torque-transmitting mechanism (C4). As shown, the first reverse ratio (R1) may be achieved with the selective engagement of the sixth torque-transmitting mechanism (C3) and the fifth torque-transmitting mechanism (B3). A second reverse ratio (R2) may be achieved with the selective engagement of the sixth torque-transmitting mechanism (C3) and the third torque-transmitting mechanism (B1). A third reverse ratio (R3) may be achieved with the selective engagement of the sixth torque-transmitting mechanism (C3) and the fourth torque-transmitting mechanism (B2). A fourth reverse ratio (R4) may be achieved with the selective engagement of the second torque-transmitting mechanism (C2) and the fifth torque-transmitting mechanism (B3).

In neutral (N), none of the torque-transmitting mechanisms carry torque. One or more of the torque-transmitting mechanisms, however, may be engaged in neutral but not carrying torque. For example, the third and/or fifth torque-transmitting mechanisms can be engaged in neutral.

A first forward ratio (shown as F1) in the table of FIG. 4 is achieved by selectively engaging the first torque-transmitting mechanism (C1) and the fifth torque-transmitting mechanism (B3). In FIG. 2, for example, the first torque-transmitting mechanism 240 and the fifth torque-transmitting mechanism 248 are selectively engaged. Thus, when transitioning between neutral and the first forward range, the fifth torque-transmitting mechanism may already be engaged, and the first torque-transmitting mechanism is selectively engaged.

In a second or subsequent forward ratio, indicated as F2 in FIG. 4, the first torque-transmitting mechanism (C1) and the third torque-transmitting mechanism (B1) are selectively engaged. Therefore, when transitioning between the first forward ratio and the second forward ratio, the fifth torque-transmitting mechanism is released and the third torque-transmitting mechanism is engaged.

In a third or subsequent forward ratio, indicated as F3 in FIG. 4, the first torque-transmitting mechanism (C1) and the fourth torque-transmitting mechanism (B2) are selectively engaged. Therefore, when transitioning between the second forward ratio and the third forward ratio, the third torque-transmitting mechanism is released and the fourth torque-transmitting mechanism is engaged.

In a fourth or the next subsequent forward ratio, indicated as F4 in FIG. 4, the first torque-transmitting mechanism (C1) and the seventh torque-transmitting mechanism (C4) are selectively engaged. Thus, to transition from the third forward ratio and upshift to the fourth forward ratio, the fourth torque-transmitting mechanism is released and the seventh torque-transmitting mechanism is engaged.

In a fifth or the next subsequent forward ratio, indicated as F5 in FIG. 4, the first torque-transmitting mechanism (C1) and the sixth torque-transmitting mechanism (C3) are selectively engaged. Thus, to transition from the fourth forward ratio and upshift to the fifth forward ratio, the seventh torque-transmitting mechanism is released and the sixth torque-transmitting mechanism is engaged.

In a sixth or the next subsequent forward ratio, indicated as F6 in FIG. 4, the first torque-transmitting mechanism (C1) and the second torque-transmitting mechanism (C2) are selectively engaged. Thus, to transition from the fifth forward ratio and upshift to the sixth forward ratio, the sixth torque-transmitting mechanism is released and the second torque-transmitting mechanism is engaged.

In a seventh or the next subsequent forward ratio, indicated as F7 in FIG. 4, the second torque-transmitting mechanism (C2) and the sixth torque-transmitting mechanism (C3) are selectively engaged. Thus, to transition from the sixth forward ratio and upshift to the seventh forward ratio, the first torque-transmitting mechanism is released and the sixth torque-transmitting mechanism is engaged.

In an eighth or the next subsequent forward ratio, indicated as F8 in FIG. 4, the second torque-transmitting mechanism (C2) and the seventh torque-transmitting mechanism (C4) are selectively engaged. Thus, to transition from the seventh forward ratio and upshift to the eighth forward ratio, the sixth torque-transmitting mechanism is released and the seventh torque-transmitting mechanism is engaged.

In a ninth or the next subsequent forward ratio, indicated as F9 in FIG. 4, the second torque-transmitting mechanism (C2) and the fourth torque-transmitting mechanism (B2) are selectively engaged. Thus, to transition from the eighth forward ratio and upshift to the ninth forward ratio, the seventh torque-transmitting mechanism is released and the fourth torque-transmitting mechanism is engaged.

Figure 3:
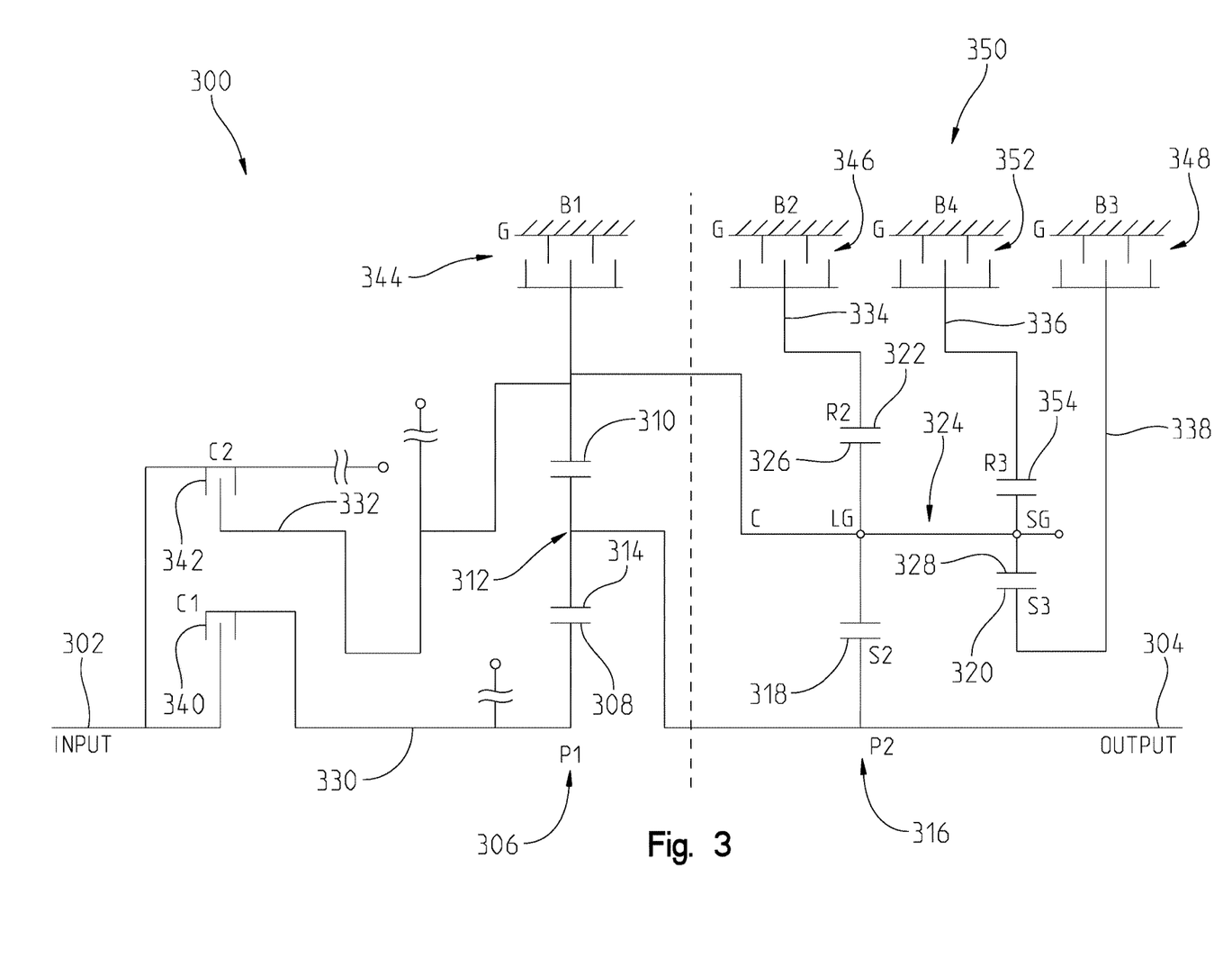
FIG. 3 is a diagrammatic view of a second implementation of a multi-speed transmission.

Referring now to FIG. 3, another implementation of the present disclosure is illustrated. As shown, a schematic representation or stick diagram illustrates another implementation of a multi-speed transmission 300 according to the present disclosure. The transmission 300 includes an input shaft 302 and an output shaft 304. The input shaft 302 and output shaft 304 can be disposed along the same axis or centerline of the transmission 300. In another aspect, the different shafts can be disposed along different axes or centerlines. In a further aspect, the different shafts can be disposed parallel to one another, but along different axes or centerlines.

The transmission 300 can also include a plurality of planetary gearsets. In the illustrated implementation of FIG. 3, the transmission 300 may include at least a first planetary gearset 306 and a second planetary gearset 316. Each planetary gearset can be referred to as a simple or compound planetary gearset. For example, in some aspects, one or more of the plurality of planetary gearsets can be formed as an idler planetary gearset or a Ravigneaux gearset. In FIG. 3, however, the first planetary gearset 306 is formed as a simple planetary gearset and the second planetary gearset 316 is formed as a compound planetary gearset. While only two planetary gearsets are shown in FIG. 3, the transmission 300 may include additional planetary gearsets in order to achieve a plurality of forward and reverse speeds or gear ratios. In one example, the transmission 300 may include a third planetary gearset. In another example, the transmission 300 may include a third and a fourth planetary gearset. In a further example, the transmission 300 may include a third, a fourth, and a fifth planetary gearset. In yet further examples, the transmission 300 may include six or more planetary gearsets. In other words, the transmission 300 may include a plurality of planetary gearsets to achieve a desired number of forward and reverse speeds or gear ratios.

One or more of the plurality of planetary gearsets can be arranged in different locations within the transmission 300, but for sake of simplicity and in this particular example only, the planetary gearsets are aligned in an axial direction consecutively in sequence (i.e., first, second, etc. between the input and output shafts).

The transmission 300 may also include a plurality of torque-transmitting or gearshifting mechanisms. For example, one or more of these mechanisms can include a clutch or brake. In one aspect, each of the plurality of mechanisms is disposed within an outer housing of the transmission 300. In another aspect, however, one or more of the mechanisms may be disposed outside of the housing. Each of the plurality of torque-transmitting or gearshifting mechanisms can be coupled to one or more of the plurality of planetary gearsets, which will be described further below.

In the implementation of FIG. 3, the transmission 300 can include a first torque-transmitting mechanism 340 and a second torque-transmitting mechanism 342 that are configured to function as clutches. These can be shiftable friction-locked multi-disk clutches, shiftable form-locking claw or conical clutches, wet clutches, or any other known form of a clutch. The transmission 300 can also include a third torque-transmitting mechanism 344, a fourth torque-transmitting mechanism 346, a fifth torque-transmitting mechanism 348, and a sixth torque-transmitting mechanism 352 that are configured to function as brakes (e.g., the torque-transmitting mechanism is fixedly coupled to the outer housing of the transmission 300). Each brake can be configured as a shiftable-friction-locked disk brake, shiftable friction-locked band brake, shiftable form-locking claw or conical brake, or any other type of known brake. With these five torque-transmitting mechanisms, selective shifting of at least nine forward gears and at least four reverse gears is possible.

The transmission 300 of FIG. 3 may also include seven or more different shafts, which is inclusive of the input shaft 302 and output shaft 304. Each of these shafts, designated as a first shaft 330, a second shaft 332, a third shaft 334, a fourth shaft 338, and a fifth shaft 336 are configured to be connected to one or more of the plurality of planetary gearsets or plurality of torque-transmitting mechanism between the input shaft 302 and output shaft 304. Further, in FIG. 3, the symbol refers to the corresponding shaft not ending but rather possibly connecting to another component such as an additional torque-transmitting mechanism, planetary gearset, or the like, including the components that rotate the first planetary gearset carrier 312 in reverse.

In FIG. 3, the first planetary gearset 306 can include a first sun gear 308, a first ring gear 310, and a first carrier member 312 that rotatably supports a set of pinion gears 314.

The second planetary gearset 316, which is a compound planetary gearset, can include an input or second sun gear (S2) 318, a reaction or third sun gear (S3) 320, a second ring gear 322, a third ring gear (R3) 354, and a second carrier member 324 that rotatably supports a set of pinion shafts. Each pinion shaft includes a first portion 326 (LG) and a second portion 328 (SG). The first portion 326 may include a first gear or large gear, and the second portion 328 may include a second gear or small gear. The first portion 326 has a larger diameter than the second portion 328. In one example, the first portion 326 may have 50% more gear teeth than the second portion 328. In another example, the first portion 326 may have twice as many gear teeth as the second portion 328. In a further example, the first portion 326 may have more gear teeth than the second portion 328.

The first portion 326 and second portion 328 are rotationally locked to one another such that each rotates concomitantly with the other. In one example, the first portion 326 is coaxial with the second portion 328 about the pinion shaft.

In another example, the second carrier member may rotationally support a plurality of pinion shafts, where each pinion shaft includes a first portion 326 and a second portion 328. In one example, the second carrier member 324 may support two pinion shafts. In another example, the second carrier member 324 may support three pinion shafts. In a further example, the second carrier member 324 may support four pinion shafts. In yet another example, the second carrier member 324 may support five or more pinion shafts.

In one example, the length dimension of the first portion 326 may be the same as the length dimension of the second portion 328. In another example, the length dimension of the first portion 326 may be greater than the length dimension of the second portion 328. In a further example, the length dimension of the first portion 326 may be smaller than the length dimension of the second portion 328. In some examples, the first portion 326 and second portion 328 may abut one another on the pinion shaft. In other examples, there may be a gap or space between the first portion 326 and second portion 328 on the pinion shaft.

With the first portion or gear 326 and the second portion or gear 328 located on the same pinion shaft, the first gear 326 and second gear do not mesh with one another. In the implementation of FIG. 3, the first portion or gear 326 of each spindle shaft of the second carrier member 324 meshes or couples to the second sun gear (S2) 318 and the second ring gear 322. The second portion of gear 328 of each spindle shaft of the second carrier member 324 meshes or couples to the reaction or third sun gear 320 and the third ring gear 354.

In the second planetary gearset 316, the second ring gear 322 is selectively coupled to the transmission housing (G) via the second torque-transmitting mechanism 346, the reaction or third sun gear 320 is selectively coupled to the transmission housing (G) via the third torque-transmitting mechanism 348, the first ring gear 310 and second carrier member 324 are selectively coupled to the transmission housing (G) via the first torque-transmitting mechanism 344, and the third ring gear 354 is selectively coupled to the transmission housing (G) via the sixth torque-transmitting mechanism 352.

The transmission 300 of FIG. 3 is capable of transferring torque from the input shaft 302 to the output shaft 304 in a plurality of forward gears or ratios and at least one reverse gear or ratio. Each of the forward torque ratios and the reverse torque ratios can be attained by the selective engagement of two of the torque-transmitting mechanisms (i.e., torque-transmitting mechanisms 340, 342, 344, 346, 348, 352). Those skilled in the art will readily understand that a different speed ratio is associated with each torque ratio.

As for the transmission 300, kinematic coupling of the first planetary gearset 306 is shown in FIG. 3. The first sun gear 308 is coupled to the first shaft 330 for common rotation therewith. The first carrier member 312 is coupled to the output shaft 304 and the second sun gear 318 for common rotation therewith. First ring gear 310 is coupled for common rotation with the second shaft 332 and the second carrier member 324.

With respect to the second planetary gearset 316, the input or second sun gear 318 is coupled to the output shaft 304 and the first carrier member 312 for common rotation therewith. The second ring gear 320 is coupled to the third shaft 334 for common rotation therewith. The reaction or third sun gear 318 is coupled to the fourth shaft 338 for common rotation therewith. The third ring gear 354 is coupled to the fifth shaft 336 for common rotation therewith. The first portions or gears 326 of each pinion shafts of the second carrier member 324 are configured to intermesh with the input or second sun gear 318 and the second ring gear 328, and the second portions or gears 328 of each pinion shafts of the second carrier member 324 are configured to intermesh with the reaction or third sun gear 320 and the third ring gear 354.

With regards to the kinematic coupling of the five torque-transmitting mechanisms to the previously described shafts, the multiple speed transmission 300 of FIG. 3 provides that the first torque-transmitting mechanism 340 is arranged within the power flow between at least the input shaft 302 and the first shaft 330 and the first sun gear 308. In this manner, the first torque-transmitting mechanism 340 is configured to act as a clutch. The second torque-transmitting mechanism 342 is arranged within the power flow between at least the input shaft 302 and the second shaft 332, the first ring gear 310, and the second carrier member 324. In this manner, the second torque-transmitting mechanism 342 is configured to act as a clutch. In this implementation of the transmission 300, two of the five torque-transmitting mechanisms are configured to act as a clutch and the other four torque-transmitting mechanisms are configured to act as brakes. In alternative implementations, the transmission 300 may include additional clutches and/or brakes. For example, in one specific alternative implementation, the transmission 300 includes four clutches and four brakes to achieve up to eleven forward speed or gear ratios and up to five reverse speed or gear ratios.

The third torque-transmitting mechanism 344 (B1), for example, is arranged within the power flow between the second shaft 332, the first ring gear 310, and the second carrier member 324 and the stationary transmission housing, G. The fourth torque-transmitting mechanism 346 (B2) is arranged within the power flow between the third shaft 334 and the second ring gear 322 and the stationary transmission housing, G. Moreover, the fifth torque-transmitting mechanism 348 (B3) is arranged within the power flow between the fourth shaft 338 and the reaction or third sun gear (S3) 320 and the stationary transmission housing, G. The sixth torque-transmitting mechanism 352 (B4) is arranged within the power flow between the fifth shaft 336 and the third ring gear 354 and the stationary transmission housing, G.

The kinematic couplings of the implementation in FIG. 3 can further be described with respect to the selective engagement of the torque-transmitting mechanisms with respect to one or more components of the plurality of planetary gearsets. For example, in the transmission 300, the first torque-transmitting mechanism 340 is selectively engageable to couple the input shaft 302 to the first shaft 330 and the first sun gear 308. The second torque-transmitting mechanism 342 is selectively engageable to couple the input shaft 302 to the second shaft 332, the first ring gear 310, and the second carrier member 324.

Moreover, the third torque-transmitting mechanism 344 is selectively engageable to couple second shaft 332, the first ring gear 310, and the second carrier member 324 to the housing G of the transmission 300. The fourth torque-transmitting mechanism 346 is selectively engageable to couple third shaft 334 and the second ring gear 322 to the housing G of the transmission 300. Further, the fifth torque-transmitting mechanism 348 is selectively engageable to couple the fourth shaft 338 and the reaction or third sun gear 320 to the housing G of the transmission 300. The sixth torque-transmitting mechanism 352 is selectively engageable to couple the fifth shaft 336 and the third ring gear 354 to the housing G of the transmission 300.

Figure 5:
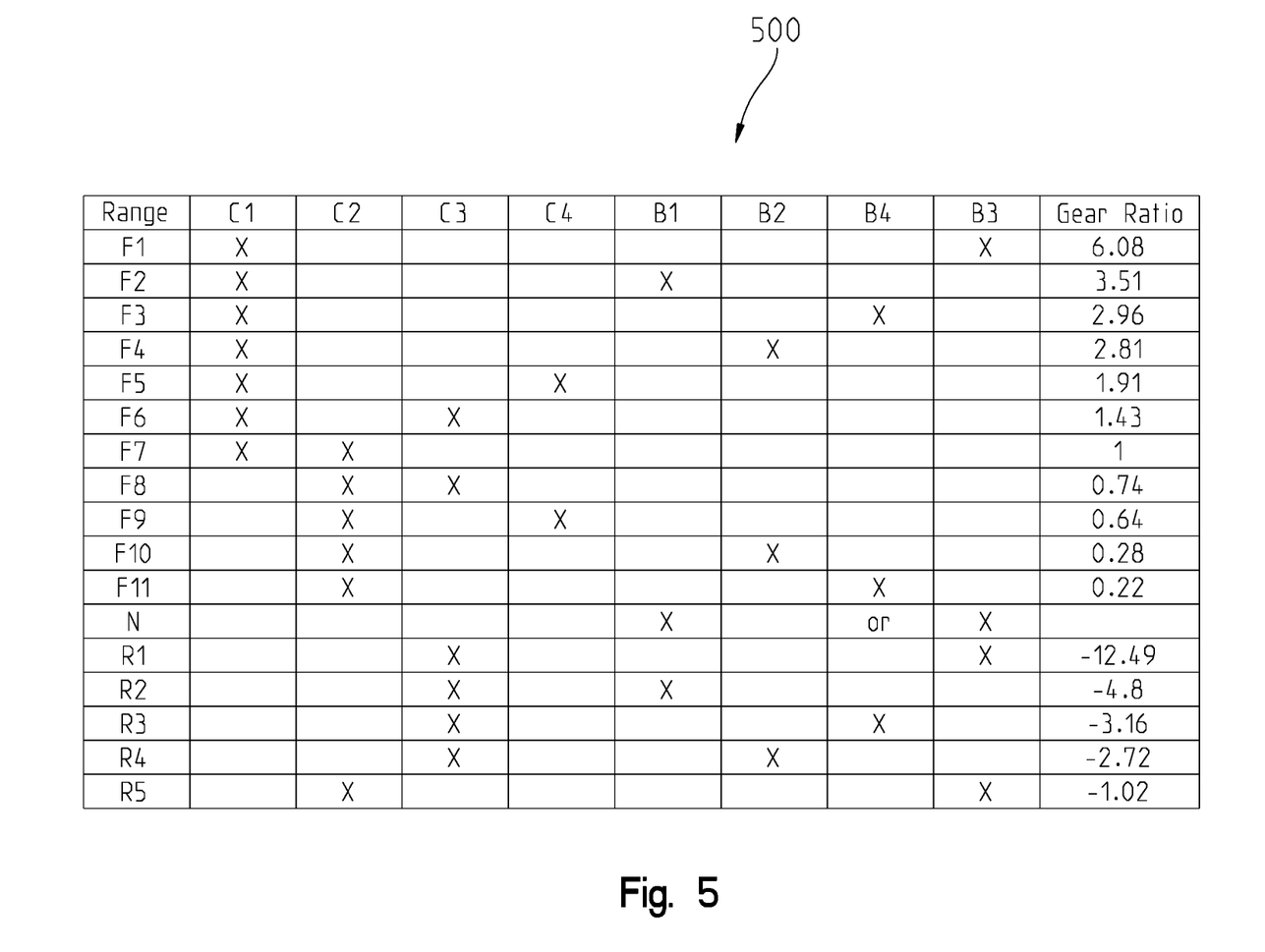
FIG. 5 is a truth table presenting an example of a state of engagement of various torque-transmitting mechanisms in each of the available forward and reverse speeds or gear ratios of the multi-speed transmission of FIG. 3.

The aforementioned implementation of FIG. 3 is capable of transmitting torque from a respective input shaft 302 to a respective output shaft 304 in at least eleven forward torque ratios and five reverse torque ratios. Referring to FIG. 5, one example of a truth table is shown representing a state of engagement of various torque transmitting mechanisms in each of the available forward and reverse speeds or gear ratios of the transmissions illustrated in FIG. 3. It is to be understood that FIG. 5 is only one example of any number of truth tables possible for achieving at least eleven forward ratios and five reverse ratios, and one skilled in the art is capable of configuring diameters, gear tooth counts, and gear configurations to achieve other ratios.

In the implementation of FIG. 5, a first reverse ratio (R1) can be achieved by the selective engagement of the torque-transmitting mechanisms as set forth in the table. Moreover, the table in FIG. 5 illustrates the implementation of FIG. 3 having an additional seventh torque-transmitting mechanism (C3) and eighth torque-transmitting mechanism (C4). As shown, the first reverse ratio (R1) may be achieved with the selective engagement of the seventh torque-transmitting mechanism (C3) and the fifth torque-transmitting mechanism (B3). A second reverse ratio (R2) may be achieved with the selective engagement of the seventh torque-transmitting mechanism (C3) and the third torque-transmitting mechanism (B1). A third reverse ratio (R3) may be achieved with the selective engagement of the seventh torque-transmitting mechanism (C3) and the sixth torque-transmitting mechanism (B4). A fourth reverse ratio (R4) may be achieved with the selective engagement of the seventh torque-transmitting mechanism (C4) and the fourth torque-transmitting mechanism (B3). A fifth reverse ratio (R5) may be achieved with the selective engagement of the second torque-transmitting mechanism (C2) and the fifth torque-transmitting mechanism (B3).

In neutral (N), none of the torque-transmitting mechanisms carry torque. One or more of the torque-transmitting mechanisms, however, may be engaged in neutral but not carrying torque. For example, the third and fifth torque-transmitting mechanisms can be engaged in neutral.

A first forward ratio (shown as F1) in the table of FIG. 5 is achieved by selectively engaging the first torque-transmitting mechanism (C1) and the fifth torque-transmitting mechanism (B3). In FIG. 3, for example, the first torque-transmitting mechanism 340 and the fifth torque-transmitting mechanism 248 are selectively engaged. Thus, when transitioning between neutral and the first forward range, the fifth torque-transmitting mechanism may already be engaged, and the first torque-transmitting mechanism is selectively engaged.

In a second or subsequent forward ratio, indicated as F2 in FIG. 5, the first torque-transmitting mechanism (C1) and the third torque-transmitting mechanism (B1) are selectively engaged. Therefore, when transitioning between the first forward ratio and the second forward ratio, the fifth torque-transmitting mechanism is released and the third torque-transmitting mechanism is engaged.

In a third or subsequent forward ratio, indicated as F3 in FIG. 5, the first torque-transmitting mechanism (C1) and the sixth torque-transmitting mechanism (B4) are selectively engaged. Therefore, when transitioning between the second forward ratio and the third forward ratio, the third torque-transmitting mechanism is released and the sixth torque-transmitting mechanism is engaged.

In a fourth or the next subsequent forward ratio, indicated as F4 in FIG. 5, the first torque-transmitting mechanism (C1) and the fourth torque-transmitting mechanism (B2) are selectively engaged. Thus, to transition from the third forward ratio and upshift to the fourth forward ratio, the sixth torque-transmitting mechanism is released and the fourth torque-transmitting mechanism is engaged.

In a fifth or the next subsequent forward ratio, indicated as F5 in FIG. 5, the first torque-transmitting mechanism (C1) and the eighth torque-transmitting mechanism (C4) are selectively engaged. Thus, to transition from the fourth forward ratio and upshift to the fifth forward ratio, the fourth torque-transmitting mechanism is released and the eighth torque-transmitting mechanism is engaged.

In a sixth or the next subsequent forward ratio, indicated as F6 in FIG. 5, the first torque-transmitting mechanism (C1) and the seventh torque-transmitting mechanism (C3) are selectively engaged. Thus, to transition from the fifth forward ratio and upshift to the sixth forward ratio, the eighth torque-transmitting mechanism is released and the seventh torque-transmitting mechanism is engaged.

In a seventh or the next subsequent forward ratio, indicated as F7 in FIG. 5, the first torque-transmitting mechanism (C1) and the second torque-transmitting mechanism (C2) are selectively engaged. Thus, to transition from the sixth forward ratio and upshift to the seventh forward ratio, the seventh torque-transmitting mechanism is released and the second torque-transmitting mechanism is engaged.

In an eighth or the next subsequent forward ratio, indicated as F8 in FIG. 5, the second torque-transmitting mechanism (C2) and the seventh torque-transmitting mechanism (C3) are selectively engaged. Thus, to transition from the seventh forward ratio and upshift to the eighth forward ratio, the first torque-transmitting mechanism is released and the seventh torque-transmitting mechanism is engaged.

In a ninth or the next subsequent forward ratio, indicated as F9 in FIG. 5, the second torque-transmitting mechanism (C2) and the eighth torque-transmitting mechanism (C4) are selectively engaged. Thus, to transition from the eighth forward ratio and upshift to the ninth forward ratio, the seventh torque-transmitting mechanism is released and the eighth torque-transmitting mechanism is engaged.

In a tenth or the next subsequent forward ratio, indicated as F10 in FIG. 5, the second torque-transmitting mechanism (C2) and the fourth torque-transmitting mechanism (B2) are selectively engaged. Thus, to transition from the ninth forward ratio and upshift to the tenth forward ratio, the eighth torque-transmitting mechanism is released and the fourth torque-transmitting mechanism is engaged.

In an eleventh or the next subsequent forward ratio, indicated as F1l in FIG. 5, the second torque-transmitting mechanism (C2) and the sixth torque-transmitting mechanism (B4) are selectively engaged. Thus, to transition from the tenth forward ratio and upshift to the eleventh forward ratio, the fourth torque-transmitting mechanism is released and the sixth torque-transmitting mechanism is engaged.

In a further implementation, up to any two of the fourth, fifth, and sixth torque-transmitting mechanisms and their associated connected gears may be omitted or removed from the add-on housing 350 with the associated reduction in added transmission speeds or gear ratios.

While exemplary implementations incorporating the principles of the present disclosure have been disclosed hereinabove, the present disclosure is not limited to the disclosed implementations. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A multiple speed transmission, comprising:
an input shaft;
an output shaft;
a first planetary gearset having a first member, a second member, and a third member;
a second planetary gearset having an input member, a reaction member, a second member, and a third member, wherein the second member comprises a first portion and a second portion;
a plurality of interconnecting members each connected between at least one of the first and second planetary gearsets and at least another of the first and second planetary gearsets;
a first torque-transmitting mechanism selectively engageable to interconnect the input shaft with the first member of the first planetary gearset;
a second torque-transmitting mechanism selectively engageable to interconnect the input shaft with the third member of the first planetary gearset and the second member of the second planetary gearset;
a third torque-transmitting mechanism selectively engageable to interconnect the third member of the first planetary gearset and the second member of the second planetary gearset with a stationary member;
a fourth torque-transmitting mechanism selectively engageable to interconnect the third member of the second planetary gearset with the stationary member; and
a fifth torque-transmitting mechanism selectively engageable to interconnect the reaction member of the second planetary gearset with the stationary member;
wherein the torque transmitting mechanisms are selectively engageable in combinations of at least two;
wherein, the selective engagement of two of the first, second, third, fourth and fifth torque-transmitting mechanisms establishes X number of forward speed ratios and Y reverse speed ratios between the input and output shafts;

wherein, the first portion and second portion of the second member are coaxial and rotationally locked to one another;

wherein the second portion of the second member of the second planetary gearset is directly coupled to the reaction member of the second planetary gearset.

2. The multiple speed transmission of claim 1, wherein the output shaft is continuously interconnected with the second member of the first planetary gearset and the input member of the second planetary gearset.

3. The multiple speed transmission of claim 1, wherein the plurality of interconnecting members includes a first interconnecting member directly connected to the first member of the first planetary gearset.

4. The multiple speed transmission of claim 1, wherein the plurality of interconnecting members includes a second interconnecting member continuously interconnecting the third member of the first planetary gearset with the second member of the second planetary gearset.

5. The multiple speed transmission of claim 1, wherein the plurality of interconnecting members includes a third interconnecting member directly connected to the third member of the second planetary gearset.

6. The multiple speed transmission of claim 1, wherein the plurality of interconnecting members includes a fourth interconnecting member directly connected to the reaction member of the second planetary gearset.

7. The multiple speed transmission of claim 1, wherein the first portion of the second member of the second planetary gearset is directly coupled to the third member of the second planetary gearset and the input member of the second planetary gearset.

8. The multiple speed transmission of claim 1, wherein the first planetary gearset is disposed within a transmission housing and the second planetary gearset is disposed within an add-on housing, the add-on housing being mounted to the transmission housing.

9. The multiple speed transmission of claim 1, wherein:
the first member of the first planetary gearset comprises an input to the first planetary gearset and the second member of the first planetary gearset comprises an output of the first planetary gearset;
the input member of the second planetary gearset comprises an input to the second planetary gearset and the second member of the second planetary gearset comprises an output of the second planetary gearset;
the output of the second planetary gearset is connected to the third member of the first planetary gearset to form a second input to the first planetary gearset.

10. The multiple speed transmission of claim 1, wherein:
the first member of the first planetary gearset, the input member of the second planetary gearset and the reaction member of the second planetary gearset comprise sun gears;
the second member of the first and second planetary gearsets comprise carrier members; and
the third members of the first and second planetary gearsets comprise ring gears.

11. A multiple speed transmission, comprising:
an input shaft;
an output shaft;
a first planetary gearset having a sun gear, a carrier member, and a ring gear;
a second planetary gearset having an input member, a reaction member, a carrier member, and a ring gear, wherein the carrier member comprises a first gear and a second gear;
a plurality of interconnecting members each connected between at least one of the first and second planetary gearsets and at least another of the first and second planetary gearsets;
a first torque-transmitting mechanism selectively engageable to interconnect the input shaft with the sun gear of the first planetary gearset;
a second torque-transmitting mechanism selectively engageable to interconnect the input shaft with the ring gear of the first planetary gearset and the carrier member of the second planetary gearset;
a third torque-transmitting mechanism selectively engageable to interconnect the ring gear of the first planetary gearset and the carrier member of the second planetary gearset with a stationary member;
a fourth torque-transmitting mechanism selectively engageable to interconnect the ring gear of the second planetary gearset with the stationary member; and
a fifth torque-transmitting mechanism selectively engageable to interconnect the reaction member of the second planetary gearset with the stationary member;
wherein the torque transmitting mechanisms are selectively engageable in combinations of at least two;
wherein the selective engagement of two of the first, second, third, fourth and fifth torque-transmitting mechanisms establishes X number of forward speed ratios and Y reverse speed ratios between the input and output shafts;
wherein the first gear and second gear of the carrier member of the second planetary gearset are coaxial and rotationally locked to one another;
wherein the first gear comprises a greater diameter than the second gear.

12. The multiple speed transmission of claim 11, wherein:
the first gear of the carrier member of the second planetary gearset is directly coupled to the ring gear of the second planetary gearset and the input member of the second planetary gearset;
the second gear of the carrier member of the second planetary gearset is directly coupled to the reaction member of the second planetary gearset.

13. A multiple speed transmission, comprising:
an input shaft;
an output shaft;
a first planetary gearset having a sun gear, a first carrier member, and a first ring gear;
a second planetary gearset having an input member, a reaction member, a second carrier member, a second ring gear, and a third ring gear, wherein the second carrier member comprises a first gear and a second gear;
a plurality of interconnecting members each connected between at least one of the first and second planetary gearsets and at least another of the first and second planetary gearsets;
a first torque-transmitting mechanism selectively engageable to interconnect the input shaft with the sun gear of the first planetary gearset;
a second torque-transmitting mechanism selectively engageable to interconnect the input shaft with the first ring gear of the first planetary gearset and the second carrier member of the second planetary gearset;

a third torque-transmitting mechanism selectively engageable to interconnect the first ring gear of the first planetary gearset and the second carrier member of the second planetary gearset with a stationary member;

a fourth torque-transmitting mechanism selectively engageable to interconnect the second ring gear of the second planetary gearset with the stationary member;

a fifth torque-transmitting mechanism selectively engageable to interconnect the reaction member of the second planetary gearset with the stationary member;

a sixth torque-transmitting mechanism selectively engageable to interconnect the third ring gear of the second planetary gearset with the stationary member;

wherein the torque transmitting mechanisms are selectively engageable in combinations of at least two;

wherein, the selective engagement of two of the first, second, third, fourth, fifth, and sixth torque-transmitting mechanisms establishes X number of forward speed ratios and Y reverse speed ratios between the input and output shafts;

wherein, the first gear and the second gear of the second carrier member are coaxial and rotationally locked to one another, the first gear having a greater diameter than the second gear.

14. The multiple speed transmission of claim 13, wherein the output shaft is continuously interconnected with the first carrier member of the first planetary gearset and the input member of the second planetary gearset.

15. The multiple speed transmission of claim 13, wherein the plurality of interconnecting members includes a first interconnecting member directly connected to the sun gear of the first planetary gearset.

16. The multiple speed transmission of claim 13, wherein the plurality of interconnecting members includes a second interconnecting member continuously interconnecting the first ring gear of the first planetary gearset with the second carrier member of the second planetary gearset.

17. The multiple speed transmission of claim 13, wherein the plurality of interconnecting members includes a third interconnecting member directly connected to the second ring gear of the second planetary gearset.

18. The multiple speed transmission of claim 13, wherein the plurality of interconnecting members includes a fourth interconnecting member directly connected to the reaction member of the second planetary gearset.

19. The multiple speed transmission of claim 13, wherein the plurality of interconnecting members includes a fifth interconnecting member directly connected to the third ring gear of the second planetary gearset.

* * * * *